United States Patent
Chen

(10) Patent No.: US 10,776,067 B2
(45) Date of Patent: Sep. 15, 2020

(54) MULTI-SCREEN DISPLAY METHOD AND DISPLAY DEVICE

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/342,136

(22) PCT Filed: Dec. 16, 2017

(86) PCT No.: PCT/CN2017/116725
§ 371 (c)(1),
(2) Date: Apr. 15, 2019

(87) PCT Pub. No.: WO2018/121312
PCT Pub. Date: Jul. 5, 2018

(65) Prior Publication Data
US 2019/0258445 A1     Aug. 22, 2019

(30) Foreign Application Priority Data

Dec. 30, 2016  (CN) .......................... 2016 1 1265522

(51) Int. Cl.
*G06F 3/14*     (2006.01)
*H04N 21/41*    (2011.01)
(Continued)

(52) U.S. Cl.
CPC ............ *G06F 3/1446* (2013.01); *G06F 3/165* (2013.01); *H04N 21/4122* (2013.01);
(Continued)

(58) Field of Classification Search
CPC .................. G06F 3/1446; G06F 3/165; G06F 2203/04803; G09G 2320/0261;
(Continued)

(56) References Cited

U.S. PATENT DOCUMENTS 9,747,015 B2 *   8/2017  Forutanpour ........... G06F 1/163
2015/0022732 A1*  1/2015  Park ....................... G06F 3/044
                                                        349/12
(Continued)

*Primary Examiner* — Muhammad N Edun
(74) *Attorney, Agent, or Firm* — WPAT, PC

(57) ABSTRACT

Embodiments of the disclosure provide a multi-screen display method and a display device including a curved surface display screen. The method is applied to the display device and includes the following steps. Position information of a preset folding line in the curved surface display screen is obtained when screen is bent according to the preset folding line, wherein the preset folding line is a boundary between the two adjacent sub-curved surface display screens formed thereby. A display interface of the screen is divided into a plurality of display sub-interfaces according to the position information, wherein a screen splitting line between two adjacent display sub-interfaces coincides with the preset folding line. The display contents selected by the user in the plurality of display sub-interfaces are obtained; and the selected display contents are displayed in the display sub-interfaces.

18 Claims, 6 Drawing Sheets

(51) Int. Cl.
  *H04N 21/43* (2011.01)
  *G06F 3/16* (2006.01)
  *H04N 21/431* (2011.01)

(52) U.S. Cl.
  CPC ....... *H04N 21/431* (2013.01); *H04N 21/4307* (2013.01); *G06F 2203/04803* (2013.01); *G09G 2320/0261* (2013.01); *G09G 2354/00* (2013.01); *G09G 2380/02* (2013.01)

(58) Field of Classification Search
  CPC ........... G09G 2380/02; G09G 2354/00; H04N 21/4307; H04N 21/431; H04N 21/4122; H04N 21/439
  See application file for complete search history.

(56) References Cited

U.S. PATENT DOCUMENTS

2015/0185968 A1* 7/2015 Kim ...................... G06F 3/0484
  715/788
2016/0372083 A1* 12/2016 Taite ........................ G09G 5/14

* cited by examiner

MULTI-SCREEN DISPLAY METHOD AND DISPLAY DEVICE

FIELD OF THE DISCLOSURE

The disclosure relates to the field of display technologies, and more particularly to a multi-screen display method and a display device.

BACKGROUND

At present, more and more liquid crystal panels need to use a curved surface display, and the curved surface display brings different experience to consumers and thus gradually becomes a new development direction in the industry. Wherein flexible curved surface displays (with a freely changed curvature) even attract more attention of users. However, if the existing curved displays are used, multiple users can only view a same picture content simultaneously, while if an existing screen splitting display technology or PBP technology is used, multiple users can view different picture contents simultaneously, but since a curved surface screen will cause mutual interference of the picture contents, a better visual experience is not realized.

SUMMARY

Embodiments of the disclosure provide a multi-screen display method and a display device, realizing that different users can view different picture contents without mutual interference from a same display screen.

The present disclosure provides a multi-screen display method, which is applied to a display device comprising a curved surface display screen. The method comprises the following steps: obtaining position information of a preset folding line in the curved surface display screen when the curved surface display screen is detected to be bent along the preset folding line and a portion of the display screen corresponding to the preset folding line protrudes out therefrom, wherein the curved surface display screen is bent and then split into at least two sub-curved surface display screens along the preset folding line, the preset folding line is a boundary between each two neighboring sub-curved surface display screens formed thereby; dividing a display interface of the curved surface display screen into a plurality of display sub-interfaces according to the position information, wherein a screen splitting line between two neighboring display sub-interfaces coincides with the preset folding line there between; obtaining the display contents selected by the user in the plurality of display sub-interfaces; displaying the selected display contents through the display sub-interfaces respectively; detecting respective ambient brightness of each sub-curved surface display screen; and adjusting respective display brightness of each sub-curved surface display screen according to respective ambient brightness thereof.

The present disclosure also provides a display device. The display device includes a curved surface display screen, a first acquiring module, a dividing module, a second acquiring module, a display module, at least two brightness detecting modules, and a brightness adjusting module. The first acquiring module is configured for acquiring position information of a preset folding line in the curved surface display screen when the curved surface display screen is detected to be bent by a user along the preset folding line, wherein the curved surface display screen is bent and then split into at least two sub-curved surface display screens according to the preset folding line, and the preset folding line is a boundary between each two adjacent sub-curved surface display screens formed thereby. The dividing module is configured for dividing a display interface of the curved surface display screen into a plurality of display sub-interfaces according to the position information, wherein a screen splitting line between two adjacent display sub-interfaces coincides with the preset folding line there between. The second acquiring module is configured for acquiring display contents selected by the user in the plurality of display sub-interfaces. The display module is configured for displaying the selected display contents through the display sub-interfaces. The light detecting modules are configured to detect respective ambient brightness of each sub-curved surface display screen. The brightness adjusting module is configured to adjust display brightness of each sub-curved surface display screen according to respective ambient brightness thereof.

According to the display device in the embodiment of the disclosure, a physical screen bending and splitting manner is performed on the curved surface display screen by a user according to a preset folding line, screen splitting of a display interface corresponding to the physical screen bending and splitting manner is adopted on software to divide the curved surface display screen into a plurality of display sub-interfaces, which display different contents, thereby realizing that multiple uses view different screen contents simultaneously. The display brightness of each sub-curved surface display screen is adjusted more in line with the actual needs, thus ensuring the effect of using the curved surface display screen in a bent and split manner and saving energy than previous technology.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts.

DETAILED DESCRIPTION OF PREFERRED EMBODIMENTS

Figure 1:
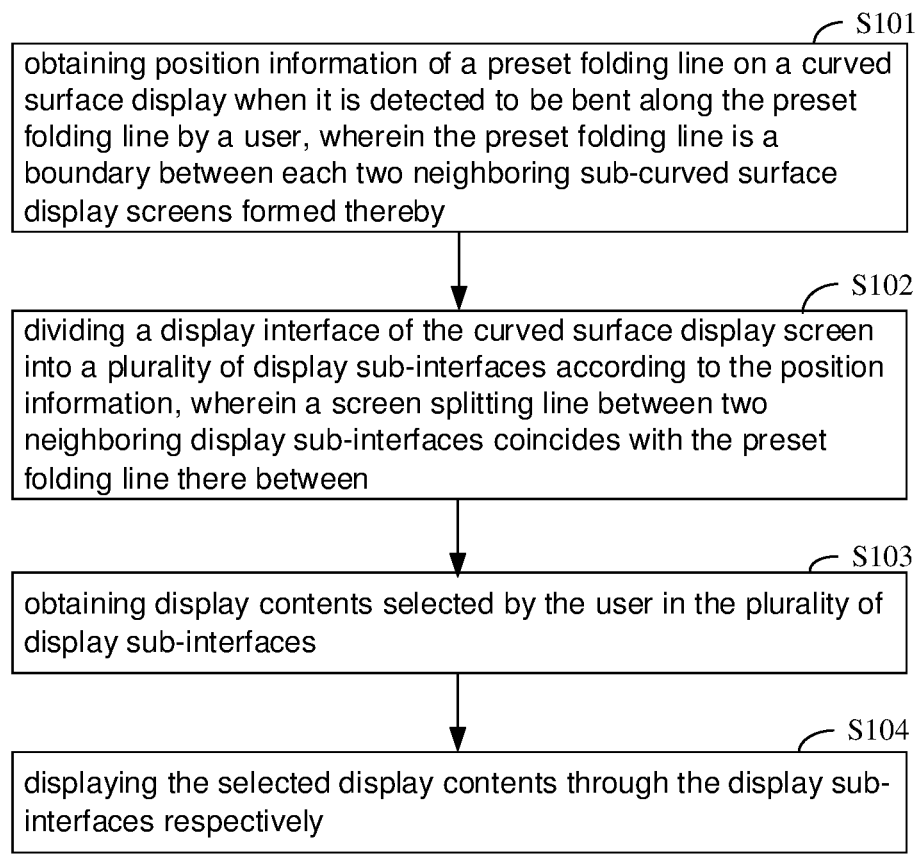
FIG. 1 is a schematic flowchart of a multi-screen display method provided by an embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Referring to FIG. 1, FIG. 1 is a schematic flowchart of a multi-screen display method provided by an embodiment of the disclosure. The multi-screen display method is applied to a display device, and the display device includes a curved surface display screen, and the curved surface display screen may be bent into a plurality of sub-curved surface display screens by an external force. As shown in FIG. 1, the multi-screen display method includes steps S101 to S104.

S101, when it is detected that the user bends the curved surface display screen along a preset folding line, the position information of the preset folding line is obtained. The preset folding line is a boundary between two adjacent sub-curved surface display screens formed by the screen bending and splitting.

Figure 2:
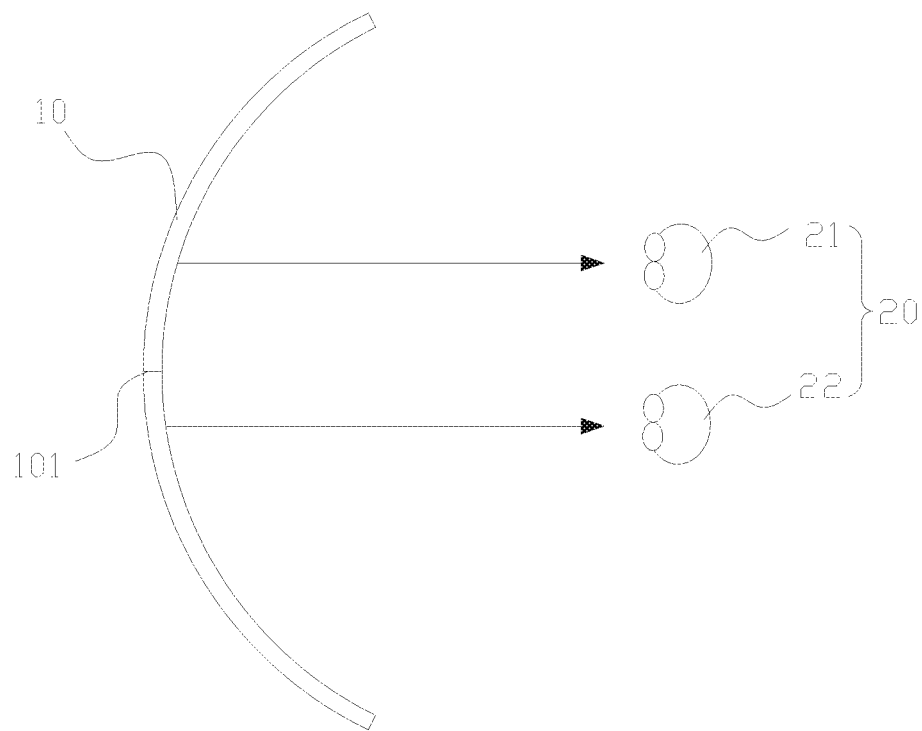
FIG. 2 is a schematic view of a user using a curved surface display screen provided by an embodiment of the disclosure.
Figure 3:
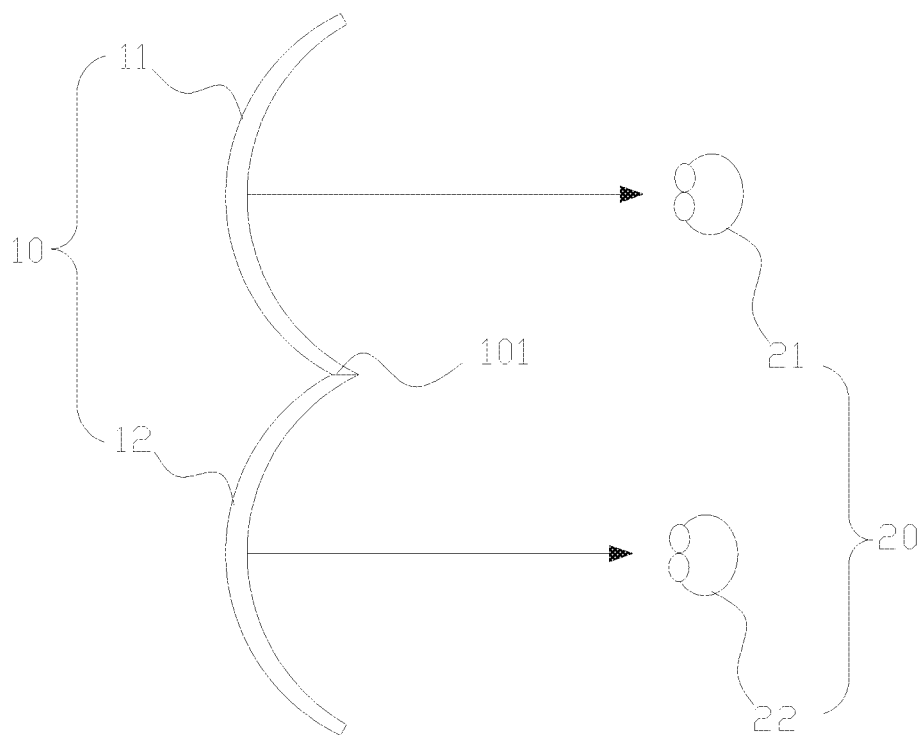
FIG. 3 is an effect schematic view when the user uses a multi-screen display method to view a curved surface display screen provided by an embodiment of the disclosure.
Figure 4:
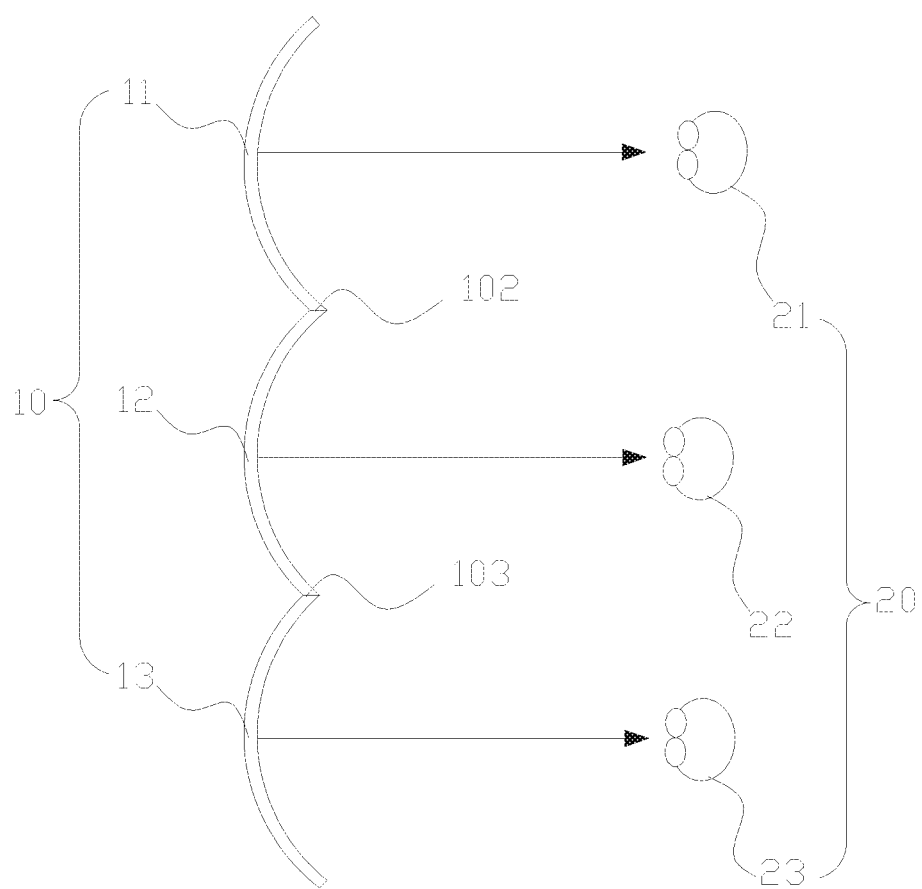
FIG. 4 is an effect schematic view when the user uses a multi-screen display method to view a curved surface display screen provided by an embodiment of the disclosure.

In the embodiment of the disclosure, when several users use the curved surface display screen to view the picture contents of the display screen, if the users want to view different picture contents simultaneously by using the curved surface display screen, then the curved surface display screen can be bent into at least two sub-curved surface display screens by an external force according to the preset folding line. The preset folding line is a boundary line between each two adjacent sub-curved surface display screens formed by bending the previous display screen. Specifically, referring to FIGS. 2 and 3, FIG. 2 is a schematic view when a user uses a curved surface display screen for viewing provided by an embodiment of the disclosure, and FIG. 3 is an effect schematic view when the user uses a multi-screen display method for viewing by a curved surface display screen provided by an embodiment of the disclosure. As shown in FIG. 2, a curved surface display screen 10 is provided with a preset folding line 101. The number of the preset folding line 101 may be more than one. When multiple users 20 (for example users 21 and 22) use the curved surface display screen 10 to view programs, the users 21 and 22 want to watch different programs using the curved surface display screen 10 simultaneously, then the curved surface display screen 10 may be bent and split according to the preset folding line 101, and two sub-curved surface display screens can be formed along the preset folding line 101. As shown in FIG. 3, the curved surface display screen 10 is bent and split into a first curved surface display screen 11 and a second curved surface display screen 12 according to the preset folding line 101. When a plurality of preset folding lines are defined, the curved surface display screen may be split into a plurality of sub-curved surface display screens. For example, a second preset folding line 102 and a third preset folding line 103 are defined in FIG. 4, and the curved surface display screen 10 may be bent and split into a first curved surface display screen 11, a second curved surface display screen 12, and a third curved surface display screen 13, along the second preset folding line 102 and the third preset folding line 103.

When screen bending and splitting carried out on the curved surface display screen by a user according to the preset folding line is detected, specifically, a sensor 321 may be used for detection. For example, a pressure sensor is arranged at the preset folding line, when a pressure value detected by the pressure sensor reaches certain preset pressure threshold range, it is confirmed that the user wants to bend the curved surface display screen and wants to split it along the preset folding line. At this point, the position information of the preset folding line on the curved surface display screen is acquired, specifically, the preset folding line includes but not limited to be a vertical folding line. If the preset folding line is the vertical folding line, the corresponding column pixel units along the vertical folding line in the curved surface display screen are confirmed, the pixel units of said column may serve as the position information of the vertical folding line of the curved surface display screen. And the position information of the preset folding line of the curved surface display screen may also be determined by other manners.

S102, dividing a display interface of the curved surface display screen into a plurality of display sub-interfaces according to the position information, wherein a screen splitting line between two adjacent display sub-interfaces coincides with the preset folding line.

In the embodiment of the disclosure, the display interface of the curved surface display screen is divided into a plurality of display sub-interfaces according to the position information, specifically, the display interface of the curved surface display screen 10 is divided into a display sub-interface of the first curved surface display screen 11 and a display sub-interface of the second curved surface display screen 12, and the two display sub-interfaces are independent, may be scaled-down versions of the previous display interface of the curved surface display screen 10, and may also be new display interfaces. What is most important is that the screen splitting line of the two display sub-interfaces coincides with the preset folding line, and the position of the screen splitting line is decided by the preset folding line of the curve surface display screen. The screen splitting display of the display interfaces is correspondingly realized on software according to physical screen splitting of the curve surface display screen (bent into a plurality of display screens by hardware).

S103, acquiring the display contents selected by the user in the plurality of display sub-interfaces.

In the embodiment of the disclosure, the display contents selected by the user in the plurality of display sub-interfaces are obtained. Specifically, if the user 21 and the user 22 want to view different screen contents, after the above steps, the user may select different video or character contents on the display sub-interface of the first curved surface display screen 11 and the display sub-interface of the second curved surface display screen 12. For example, if the user 21 selects a video A in the display sub-interface of the first curved surface display screen 11 and the user 22 selects a video B in the display sub-interface of the second curved surface display screen 12, the selected display contents are obtained, that means, i.e., the video A and video B are acquired.

S104, the display contents which is selected in the display sub-interfaces, are displayed through the display sub-interfaces.

In the embodiment of the disclosure, for example, if the user 21 selects the video A in the display sub-interface of the first curved surface display screen 11, then the video A is displayed by the display sub-interface of the first curved surface display screen 11, and if the user 22 selects the video B in the display sub-interface of the second curved surface display screen 12, then the video B is displayed by the display sub-interface of the second curved surface display screen 12. Therefore, different users can watch different display contents by the curved surface display screen and corresponding split screens of the display interface. Since when the portion of the display screen corresponding to the preset folding line of the curved surface display screen will protrude out when the curved surface display screen is bent, the preset folding line may also shield the display contents on both sides of the screen splitting line, such that the users truly visually enjoy the effect of two display screens, unlike the existing screen splitting technology, thereby realizing that different users can view different screen contents without mutual interference by use the same display screen.

In addition, a situation may be appeared that one sub-curved surface display screen is facing the light source while the other sub-curved surface display screen faces away from the light source, when the user uses the curved surface display screen after bent and split. Under such circumstance, the multi-screen display method of the present disclosure further includes the following steps: detecting respective environmental brightness of the sub-curved surface display screens, and adjusting respective display brightness of the sub-curved surface display screens according to respective environmental brightness. Therefore, the multi-screen display method of the present disclosure can be implemented by the brightness detection module 310 (described later) and brightness adjustment module 311 (described later). The brightness detection module 310 can detect respective environment brightness of the sub-curved surface display screens. The brightness adjustment module 311 can adjust respective sub-curved surface display screens according to respective environment brightness accordingly. So, the display brightness of each sub-curved surface display screen is adjusted more in line with the actual needs, thus ensuring the effect of using the curved surface display screen in a bent and split manner and saving energy than previous technology.

Figure 5:
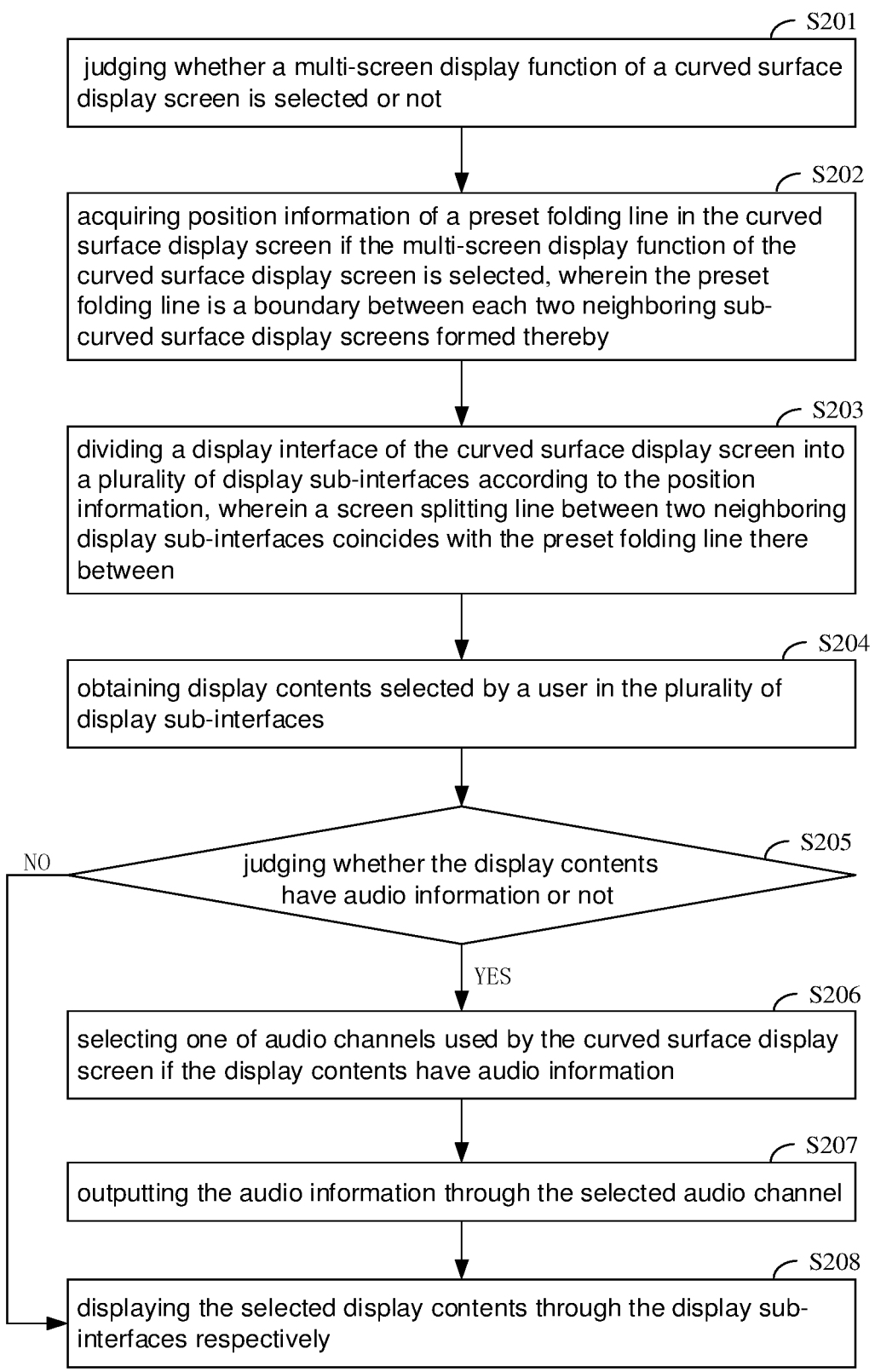
FIG. 5 is another schematic flowchart of a multi-screen display method provided by an embodiment of the disclosure.

Referring to FIG. 5, FIG. 5 is a schematic flowchart of a multi-screen display method provided by an embodiment of the disclosure. The multi-screen display method is applied to a display device, the display device includes a curved surface display screen, the curved surface display screen can be bent into a plurality of sub-curved surface display screens by an external force. The curved surface display screen is provided with a plurality of audio channels, or a host corresponding to the curved surface display screen includes a plurality of audio channels. As shown in FIG. 5, the multi-screen display method includes the following steps of S201-S206.

S201, judging whether a multi-screen display function of the curved surface display screen is selected or not, when it is detected that the user bends the curved surface display screen along a preset fold line.

In the embodiment of the disclosure, the multi-screen display function of the curved surface display screen may correspond to a screen splitting key mode, a screen splitting key 322 is positioned at a bottom edge of the curved surface display screen. When the user bends the curved surface display screen and wants to split it along the preset folding line, the user is prompted to select the multi-function display function of the curved surface display screen, for example, the multi-function display function of the curved surface display screen may be selected by pressing the screen splitting key 322. Whether the multi-function display function of the curved surface display screen is selected or not is judged, step S202 is executed if the multi-function display function of the curved surface display screen is selected, and if the multi-function display function of the curved surface display screen is not selected, then a prompt message for prompting the user to select the multi-screen display function of the curved surface display screen is output.

S202, acquiring the position information of the preset folding line on the curved surface display screen if the multi-screen display function of the curved surface display screen is selected, wherein the preset folding line is a boundary line between each two adjacent sub-curved surface display screens formed by the screen bending and splitting.

In the embodiment of the disclosure, the position information of the preset folding line on the curved surface display screen is acquired, specifically, the preset folding line includes but not limited to be a vertical folding line. If the preset folding line is the vertical folding line, pixel units of a corresponding column of the vertical folding line in the curved surface display screen are acquired, the pixel units of such column may serve as the position information of the vertical folding line on the curved surface display screen, and the position information of the preset folding line on the curved surface display screen may also be determined by other manners.

S203, dividing a display interface of the curved surface display screen into a plurality of display sub-interfaces according to the position information, wherein a screen splitting line between two adjacent display sub-interfaces coincides with the preset folding line.

In the embodiment of the disclosure, a display interface of the curved surface display screen is divided into a plurality of display sub-interfaces according to the position information. Referring to FIG. 2, specifically, the display interface of the curved surface display screen 10 is divided into a display sub-interface of the first curved surface display screen 11 and a display sub-interface of the second curved surface display screen 12, and the two display sub-interfaces may be scaled-down versions of the display interface of the original curved surface display screen 10, and may also be new display interfaces. What is most important is that the screen splitting line of the two display sub-interfaces coincides with the preset folding line, and the position of the screen splitting line is decided by the preset folding line of the curved surface display screen. The screen splitting display of the display interfaces is correspondingly realized on software according to physical screen splitting of the curve surface display screen (bent into a plurality of display screens by hardware).

S204, obtaining the display contents selected by the user in the plurality of display sub-interfaces.

In the embodiment of the disclosure, the display contents selected by the user in the plurality of display sub-interfaces are acquired. Specifically, if the user 21 and the user 22 want to view different picture contents, after the above steps, the user may select different video or character contents on the display sub-interface of the first curved surface display screen 11 and the display sub-interface of the second curved surface display screen 12. For example, if the user 21 selects a video A in the display sub-interface of the first curved surface display screen 11 and the user 22 selects a video B in the display sub-interface of the second curved surface display screen 12, the display contents selected by the user, i.e., the video A and video B are obtained.

S205, judging whether the display contents have audio information.

In the embodiment of the disclosure, whether the display contents have audio information is judged, for example, the display contents are video A and video B, and the video A and video B may have audio information. A method for judging whether the display contents have audio information adopts an existing detection method for audio information, and is not described in detail here. If the display contents have audio information, step S206 is executed; and if the display contents have no audio information, then step S208 is executed.

S206, selecting one of audio channels used by the curved surface display screen if the display contents have audio information.

In the embodiment of the disclosure, the plurality of audio channels used by the curved surface display screen are independent audio channels, and may respectively transmit different audio information simultaneously. Different audio channels correspond to different audio devices, for example, an earphone interface and a loudspeaker, wherein a plurality of earphone interfaces and a plurality of loudspeakers may be disposed, and the plurality of earphone interfaces and loudspeakers are connected to different audio channels respectively.

S207, outputting the audio information through the selected audio channel.

In the embodiment of the disclosure, the selected audio channel refers to different audio channels selected for different split screens. The audio information in the display content selected in the split screen is output by the audio channel corresponding to the split screen, thereby realizing that different adjusted display contents are viewed by different display sub-interfaces of the curve surface display screen. Or the audio information of respective display contents may be only listened, mutual interference is prevented, and visual and audio experience during viewing is improved.

S208, displaying the adjusted display contents selected in the display sub-interfaces through the display sub-interfaces.

In the embodiment of the disclosure, for example, if the user 21 selects the video A in the display sub-interface of the first curved surface display screen 11, then the video A is displayed in the display sub-interface of the first curved surface display screen 11. If the user 22 selects the video B in the display sub-interface of the second curved surface display screen 12, then the video B is displayed in the display sub-interface of the second curved surface display screen 12.

According to the embodiments of the disclosure, a physical screen bending and splitting manner is performed on the curved surface display screen by a user according to a preset folding line, screen splitting of a display interface corresponding to the physical screen bending and splitting manner is adopted on software to divide the curved surface display screen into a plurality of display sub-interfaces, which display different contents, thereby realizing that multiple uses view different picture contents simultaneously.

In addition, a situation may be appeared that one sub-curved surface display screen is facing the light source while the other sub-curved surface display screen faces away from the light source, when the user uses the curved surface display screen after bent and split. Under such circumstance, the multi-screen display method of the present disclosure further includes the following steps: detecting respective environmental brightness of the sub-curved surface display screens, and adjusting respective display brightness of the sub-curved surface display screens according to respective environmental brightness. Therefore, the multi-screen display method of the present disclosure can be implemented by the brightness detection module 310 (described later) and brightness adjustment module 311 (described later). The brightness detection module 310 can detect respective environment brightness of the sub-curved surface display screens. The brightness adjustment module 311 can adjust respective sub-curved surface display screens according to respective environment brightness accordingly. So, the display brightness of each sub-curved surface display screen is adjusted more in line with the actual needs, thus ensuring the effect of using the curved surface display screen in a bent and split manner and saving energy than previous technology.

Figure 6:
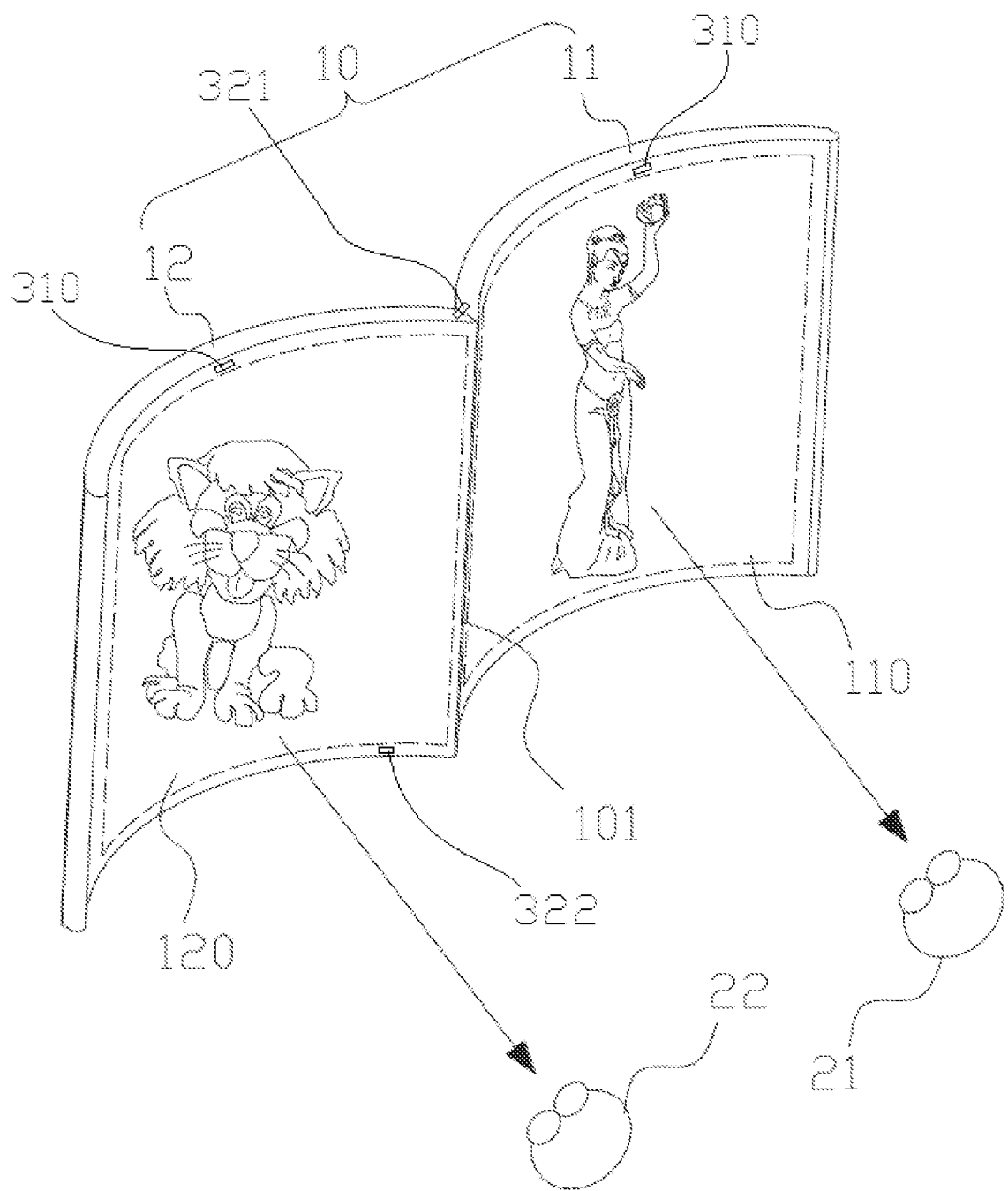
FIG. 6 is an effect schematic view when the user uses a multi-screen display method to view a curved surface display screen provided by an embodiment of the disclosure.

A specific application scenario of the above method embodiment refers to FIG. 6, and FIG. 6 is an effect schematic view when the user uses a multi-screen display method to view a curved surface display screen provided by an embodiment of the disclosure. The curved surface display screen 10 may be bent into two curved surface display screens, i.e., a first curved surface display screen 11 and a second curved surface display screen 12 according to the preset folding line 101. When multiple users want to view different programs respectively by the curved surface display screen 10, the curved surface display screen 10 may be divided into the first curved surface display screen 11 and the second curved surface display screen 12 according to the preset folding line by an external force. When a main control unit of the display screen or a host connected to the display screen detects that the curved surface display screen 10 is divided into the first curved surface display screen 11 and the second curved surface display screen 12, position information of the preset folding line in the curved surface display screen 10 is acquired, the display interface of the curved surface display screen 10 is divided into a first display sub-interface 110 and a second display sub-interface 120 according to the position information. Then the display contents that the users selected want to watch are obtained from the first display sub-interface 110 and the second display sub-interface 120 respectively, and the display contents are displayed for different users through respective display sub-interface. For example, through the first display sub-interface 110 and the second display sub-interface 120, users 21 and 22 can enjoy different display contents. Since physical screen splitting and software screen splitting are combined, the users use the multi-screen display method to view different display contents, and an effect of viewing two independent display screens is realized, thereby increasing viewing experience of the users.

Figure 7:
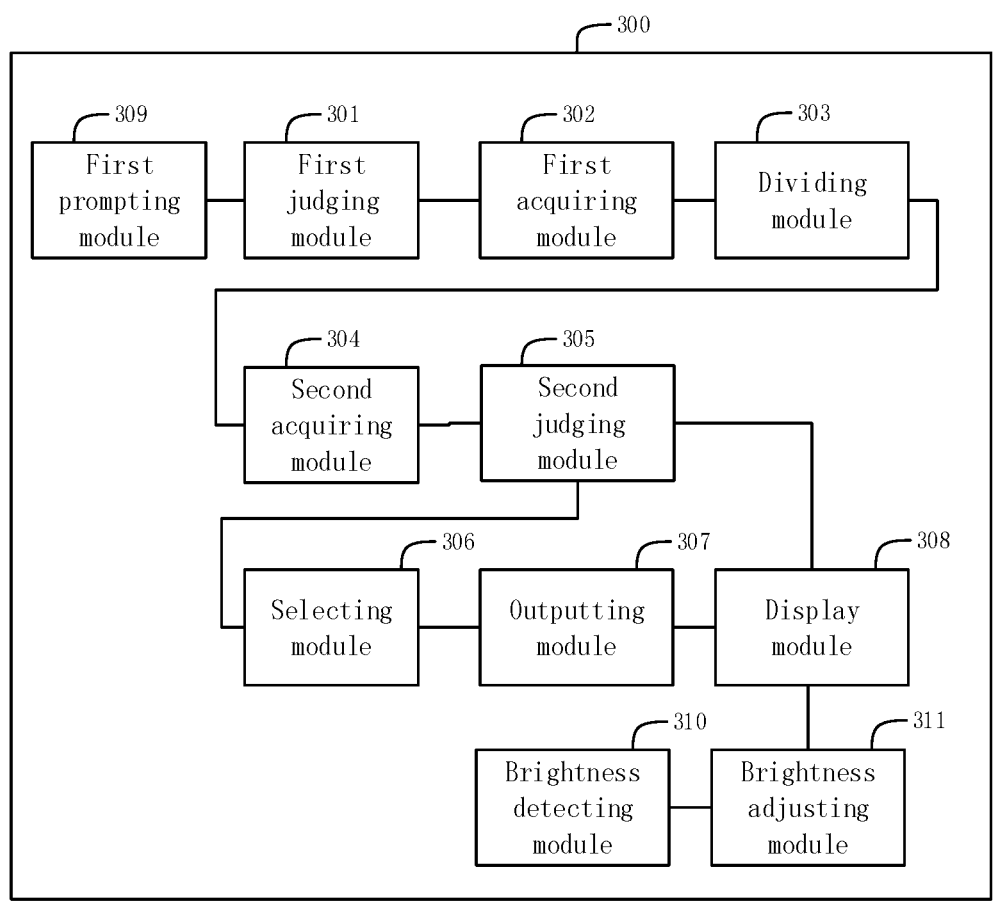
FIG. 7 is a schematic block diagram of a display device provided by an embodiment of the disclosure.

Referring to FIG. 7, FIG. 7 is a schematic block diagram of a display device by an embodiment of the disclosure. The display device includes a curved surface display screen 10, the curved surface display screen 10 may be bent and split into a plurality of sub-curved surface display screens by an external force. As shown in FIG. 7, the display device 300 includes a first judging module 301, a first acquiring module 302, a dividing module 303, a second acquiring module 304, a second judging module 305, a selecting module 306, an output module 307, a display module 308, a first prompting module 309, at least two brightness detecting modules 310, and a brightness adjusting module 311.

The first judging module 301 is configured for judging whether a multi-screen display function of the curved surface display screen is selected or not, when it is detected that a user bends the screen and wants to split it along the preset folding line. The multi-screen display function of the curved surface display screen may correspond to a screen splitting key mode, a screen splitting key 322 is defined on the curved surface display screen. After the screen bending and splitting carried out on the curved surface display screen by the user according to the preset folding line, the user is prompted to select the multi-function display function of the curved surface display screen, for example, the multi-function display function of the curved surface display screen may be selected by pressing the screen splitting key 322.

The first acquiring module 302 is configured for acquiring the position information of the preset folding line in the curved surface display screen if the multi-screen display function of the curved surface display screen is selected, wherein the preset folding line is a boundary line between two adjacent sub-curved surface display screens formed by the screen bending and splitting. The first acquiring module is specifically configured for acquiring pixel units of a corresponding column of the vertical folding line in the curved surface display screen. Specifically, the position information of the preset folding line on the curved surface display screen is acquired, specifically, the preset folding line includes but not limited to a vertical folding line, if the preset folding line is the vertical folding line, pixel units of a corresponding column of the vertical folding line in the curved surface display screen are obtained. The pixel units of such column may serve as the position information of the vertical folding line on the curved surface display screen, and the position information of the preset folding line on the curved surface display screen may also be determined by other manners.

The first prompting module 309 is configured for outputting a prompt message for prompting the user to select the multi-screen display function of the curved surface display screen if the multi-screen display function of the curved surface display screen is not selected. Specifically, the output prompt message for prompting the user to select the multi-screen display function of the curved surface display screen may non-restrictively include audio prompt contents output by a loudspeaker and/or video prompt contents output by using a display device.

The dividing module 303 is configured for dividing a display interface of the curved surface display screen into a plurality of display sub-interfaces according to the position information, wherein a screen splitting line between two adjacent display sub-interfaces coincides with the preset folding line. Specifically, referring to FIG. 2, a display interface of the curved surface display screen 10 is divided into a display sub-interface of a first curved surface display screen 11 and a display sub-interface of a second curved surface display screen 12.

The second acquiring module 304 is configured for acquiring adjusted display contents selected by the user in the plurality of display sub-interfaces. For example, a user 21 selects a video A in the display sub-interface of the first curved surface display screen 11 and a user 22 selects a video B in the display sub-interface of the second curved surface display screen 12. The display contents selected by the user are acquired, that is, the video A and the video B are acquired.

The second judging module 305 is configured for judging whether the display contents have audio information. Wherein an existing detection method for audio information is adopted. If the display contents have the audio information, then the selecting module 306 is called, and if the display contents have no audio information, then the display module 308 is called.

The selecting module 306 is configured for selecting one of audio channels used by the curved surface display screen if the display contents have audio information. Wherein the plurality of audio channels used by the curved surface display screen are independent audio channels, and may respectively transmit different audio information simultaneously, and different audio channels correspond to different audio devices, for example, an earphone interface and a loudspeaker, The output module 307 is configured for outputting the audio information by the selected audio channel. Specifically, the selected audio channel is that different audio channels are selected for different split screens. The audio information in the display contents selected in the split screen is output by the audio channel corresponding to the split screen, thereby realizing that different display contents are viewed by the display sub-interfaces of different curve surface display screens. Or the audio information of respective display contents may be only listened, mutual interference is prevented, and visual and audio experience during viewing is improved.

The display module 308 is configured for displaying the display contents selected in the display sub-interfaces. For example, if the user 21 selects the video A in the display sub-interface of the first curved surface display screen 11, then the video A is displayed through the display sub-interface of the first curved surface display screen 11. And if the user 22 selects the video B in the display sub-interface of the second curved surface display screen 12, then the video B is displayed through the display sub-interface of the second curved surface display screen 12.

Each brightness detection module 310 is configured to detect respective ambient brightness of each of the sub-curved surface display screens. Specifically, each brightness detection modules 310 may be respectively disposed at a top edge of each of the sub-curved surface display screens so as to prevent the brightness detection module 310 from being disposed in a corner area where the ambient brightness is insufficient, thereby ensuring stable and accurate detection from the brightness detection module 310, to detect the respective ambient brightness of each of the sub-curved surface display screens.

The brightness adjustment module 311 is configured to adjust the display brightness of each of the sub-curved surface display screens according to the respective ambient brightness of each of the sub-curved surface display screens.

Therefore, the multi-screen display method of the present disclosure can be implemented by the brightness detection module 310 (described later) and brightness adjustment module 311 (described later). The brightness detection module 310 can detect respective environment brightness of the sub-curved surface display screens. The brightness adjustment module 311 can adjust respective sub-curved surface display screens according to respective environment brightness accordingly. So, the display brightness of each sub-curved surface display screen is adjusted more in line with the actual needs, thus ensuring the effect of using the curved surface display screen in a bent and split manner and saving energy than previous technology.

According to the display device in the embodiment of the disclosure, a physical screen bending and splitting manner is performed on the curved surface display screen by a user according to a preset folding line, screen splitting of a display interface corresponding to the physical screen bending and splitting manner is adopted on software to divide the curved surface display screen into a plurality of display sub-interfaces, which display different contents, thereby realizing that multiple uses view different screen contents simultaneously.

Those skilled in the art can clearly know that for the purpose of convenience and compactness in description, specific working processes of the devices and modules described above can refer to corresponding processes in the foregoing method embodiment, and are not repeated here.

The steps in the method embodiment of the disclosure can be adjusted in sequence, merged and deleted according to actual needs.

The units or modules in the terminal embodiment of the disclosure can be merged, divided and deleted according to actual needs.

What are described above are only specific embodiments of the disclosure, but the protection scope of the disclosure is not limited thereto. It shall easily occur to one person skilled in the art within the technical scope of the disclosure that various changes or replacements shall be covered within the protective scope of the disclosure. Therefore, the scope of the disclosure should be the scope of the following claims.

What is claimed is:

1. A multi-screen display method, applied to a display device comprising a curved surface display screen, the method comprising:
    obtaining position information of a preset folding line in the curved surface display screen when the curved surface display screen is detected to be bent along the preset folding line and a portion of the display screen corresponding to the preset folding line protrudes out therefrom, wherein the curved surface display screen is bent and then split into at least two sub-curved surface display screens along the preset folding line, the preset folding line is a boundary between each two neighboring sub-curved surface display screens formed thereby;
    dividing a display interface of the curved surface display screen into a plurality of display sub-interfaces according to the position information, wherein a screen splitting line between two neighboring display sub-interfaces coincides with the preset folding line there between;
    obtaining the display contents selected by the user in the plurality of display sub-interfaces; and
    displaying the selected display contents through the display sub-interfaces respectively;
    detecting respective ambient brightness of each sub-curved surface display screen; and
    adjusting respective display brightness of each sub-curved surface display screen according to respective ambient brightness thereof;
    wherein before the step of obtaining position information of the preset folding line in the curved surface display screen, the multi-screen display method further comprises:
        judging whether a multi-screen display function of the curved surface display screen is selected or not; and
        acquiring the position information of the preset folding line in the curved surface display screen if the multi-screen display function of the curved surface display screen is selected, and outputting a prompt message for prompting the user to select the multi-screen display function of the curved surface display screen if the multi-screen display function of the curved surface display screen is not selected.

2. The multi-screen display method according to claim 1, wherein the preset folding line is a vertical folding line, and the corresponding column pixel unit of the vertical folding line in the curved surface display screen is obtained as position information.

3. The multi-screen display method according to claim 1, wherein after the step of obtaining the display contents selected by the user in the plurality of display sub-interfaces, the multi-screen display method further comprises:
    judging whether the display contents have audio information;
    selecting one of audio channels used by the curved surface display screen if the display contents have audio information; and
    outputting the audio information through the selected audio channel.

4. The multi-screen display method according to claim 3, wherein the preset folding line is a vertical folding line, and the corresponding column pixel unit of the vertical folding line in the curved display screen is obtained as position information.

5. The multi-screen display method according to claim 1, wherein a sensor is used to detect whether the user bends the curved surface display screen along the preset folding line or not.

6. The multi-screen display method according to claim 5, wherein the sensor is a pressure sensor, and when a pressure value detected by the pressure sensor reaches certain preset pressure threshold range, then it is judged that the user wants to bend and then split the curved surface display screen.

7. A display device, comprising:
    a curved surface display screen;
    a first acquiring module configured for acquiring position information of a preset folding line in the curved surface display screen when the curved surface display screen is detected to be bent by a user along the preset folding line, wherein the curved surface display screen is bent and then split into at least two sub-curved surface display screens according to the preset folding line, and the preset folding line is a boundary between each two adjacent sub-curved surface display screens formed thereby;

a dividing module configured for dividing a display interface of the curved surface display screen into a plurality of display sub-interfaces according to the position information, wherein a screen splitting line between two adjacent display sub-interfaces coincides with the preset folding line there between;

a second acquiring module configured for acquiring display contents selected by the user in the plurality of display sub-interfaces;

a display module configured for displaying the selected display contents through the display sub-interfaces;

at least two light detecting modules configured to detect respective ambient brightness of each sub-curved surface display screen; and a brightness adjusting module configured to adjust display brightness of each sub-curved surface display screen according to respective ambient brightness thereof;

wherein the display device further comprises a first judging module and a first prompting module, the first judging module is configured for judging whether a multi-screen display function of the curved surface display screen is selected or not, and the first acquiring module is configured for acquiring the position information of the preset folding line on the curved surface display screen if the multi-screen display function of the curved surface display screen is selected, the first prompting module is configured for outputting a prompt message for prompting the user to select the multi-screen display function of the curved surface display screen if the multi-screen display function of the curved surface display screen is not selected.

8. The display device according to claim 7, wherein the preset folding line is a vertical folding line, and the corresponding column pixel unit of the vertical folding line in the curved display screen is obtained as position information.

9. The display device according to claim 7, wherein the display device further comprises a second judging module, a selecting module, and an output module; the second judging module is configured for judging whether the display contents have audio information, the selecting module is configured for selecting one of audio channels used by the curved surface display screen if the display contents have audio information, and the output module is configured for outputting the audio information by the selected audio channel.

10. The display device according to claim 9, wherein the multiple audio channels are independent audio channels to respectively transmit different audio information simultaneously.

11. The display device according to claim 9, wherein the preset folding line is a vertical folding line, and the corresponding column pixel unit of the vertical folding line in the curved display screen is obtained as position information.

12. The display device according to claim 7, wherein the display device further comprises a sensor defined corresponding to the preset folding line, to detect the curved surface display screen is bent and split by a user along the preset folding line.

13. The display device according to claim 12, wherein the sensor is a pressure sensor, and when a pressure value detected by the pressure sensor reaches certain preset pressure threshold range, then it is judged that the user wants to bend and then split the curved surface display screen.

14. The display device according to claim 7, wherein the display device further comprises a screen splitting button defined on the curved surface display screen, and the screen splitting button is configured for selecting a multi-screen display function of the curved surface display screen by pressing.

15. The display device according to claim 7, wherein the brightness detecting module is positioned at a top portion of each sub-curved surface display screen.

16. A multi-screen display method, which is applied to a display device comprising a curved surface display screen, the method comprising:

obtaining position information of a preset folding line in the curved surface display screen when the curved surface display screen is detected to be bent along the preset folding line and a portion of the display screen corresponding to the preset folding line protrudes out therefrom, wherein the curved surface display screen is bent and then split into at least two sub-curved surface display screens along the preset folding line, the preset folding line is a boundary between each two neighboring sub-curved surface display screens formed thereby;

dividing a display interface of the curved surface display screen into a plurality of display sub-interfaces according to the position information, wherein a screen splitting line between two neighboring display sub-interfaces coincides with the preset folding line there between;

obtaining the display contents selected by the user in the plurality of display sub-interfaces; and displaying the selected display contents through the display sub-interfaces respectively;

detecting respective ambient brightness of each sub-curved surface display screen; and adjusting respective display brightness of each sub-curved surface display screen according to respective ambient brightness thereof;

wherein before the step of obtaining position information of the preset folding line in the curved surface display screen, the method further comprises:

judging whether a multi-screen display function of the curved surface display screen is selected or not; and acquiring the position information of the preset folding line in the curved surface display screen if the multi-screen display function of the curved surface display screen is selected, and outputting a prompt message for prompting the user to select the multi-screen display function of the curved surface display screen if the multi-screen display function of the curved surface display screen is not selected;

wherein after the step of obtaining the display contents selected by the user in the plurality of display sub-interfaces, the method further comprises:

judging whether the display contents have audio information or not;

selecting one of audio channels used by the curved surface display screen if the display contents have audio information; and outputting the audio information through the selected audio channel.

17. The multi-screen display method according to claim 16, wherein a sensor is used to detect whether the user bends the curved surface display screen along the preset folding line or not.

18. The multi-screen display method according to claim 17, wherein the sensor is a pressure sensor, and when a pressure value detected by the pressure sensor reaches certain preset pressure threshold range, then it is judged that the user wants to bend and then split the curved surface display screen.

* * * * *